(12) United States Patent
Bachus et al.

(10) Patent No.: US 10,190,392 B1
(45) Date of Patent: Jan. 29, 2019

(54) LANDFILL GAS WELLHEAD MONITORING AND CONTROL SYSTEM

(71) Applicant: OptiRTC, Inc., Boston, MA (US)

(72) Inventors: Robert Bachus, Marietta, GA (US); Marcus Quigley, Brookline, MA (US)

(73) Assignee: OptiRTC, Inc., Boston, MA (US)

(*) Notice: Subject to any disclaimer, the term of this patent is extended or adjusted under 35 U.S.C. 154(b) by 1147 days.

(21) Appl. No.: 13/864,893

(22) Filed: Apr. 17, 2013

Related U.S. Application Data

(60) Provisional application No. 61/625,353, filed on Apr. 17, 2012.

(51) Int. Cl.
*G05D 7/06* (2006.01)
*E21B 34/16* (2006.01)

(52) U.S. Cl.
CPC ........... *E21B 34/16* (2013.01); *G05D 7/0641* (2013.01); *Y02E 50/346* (2013.01)

(58) Field of Classification Search
None
See application file for complete search history.

(56) References Cited

U.S. PATENT DOCUMENTS

| 4,267,885 | A | * | 5/1981 | Sanderford | ........... E21B 43/122 166/250.01 |
| 5,139,548 | A | * | 8/1992 | Liu | ......... F25J 1/0022 60/39.12 |
| 6,169,962 | B1 | * | 1/2001 | Brookshire | ............... B09B 1/00 702/47 |
| 6,999,883 | B1 | * | 2/2006 | Brady | .................... B09B 1/006 702/50 |

* cited by examiner

*Primary Examiner* — Sean Shechtman
(74) *Attorney, Agent, or Firm* — Lathrop Gage LLP

(57) ABSTRACT

An automated landfill gas wellhead monitoring and control system includes a field monitoring and control system (FMCS) that receives landfill gas condition data and that controls an automated gas control valve on a wellhead as a function thereof. A remote monitoring control system (RMCS) is in communication with the FMCS and provides other data obtained from sources outside of the landfill. This additional data is used by the FMCS to control the gas control valve and the system provides a preventative configuration based on a predicted condition.

20 Claims, 7 Drawing Sheets

LANDFILL GAS WELLHEAD MONITORING AND CONTROL SYSTEM

STATEMENT REGARDING FEDERALLY SPONSORED RESEARCH OR DEVELOPMENT

N/A

BACKGROUND OF THE INVENTION

In municipal landfills, one byproduct of the decomposition of solid waste is landfill gas, which predominantly consists of carbon dioxide and methane. These gases are recognized as "greenhouse gasses" known to be damaging to the environment and, therefore, the importance of effective landfill gas management has increased significantly over the past several years. This increase is due to: (i) tightened regulatory requirements for operations and reporting activities needed to comply with the Clean Air Act; and (ii) increased importance of efficient collection and processing of landfill gas that is used in waste-to-energy facilities. Given the current emphasis in society to develop sustainable and environmentally responsible processes, the need for improved landfill gas management will increase.

As is known, gas wells are used to capture the byproduct landfill gas in most landfill gas collection and control (i.e., management) systems. Typically, referring to FIG. 1, a landfill 100 has a number of wells distributed over an area that could cover tens, and possibly hundreds, of acres. Each well has a corresponding gas wellhead 102 that is an above-ground extension of the gas well. Operation of the gas wellhead 102, i.e., the flow of landfill gases, is controlled by adjusting a flow valve on the wellhead. In many cases, as is known, some of the gas wellheads are connected in series with one another while some are connected in parallel with one another. Experience has shown, however, that adjustments to one gas wellhead can influence the response of the other gas wells.

For proper operation of a landfill gas collection and control system, the gas flow rate, temperature and gas quality are measured at each wellhead 102 and the results of the measurements are compared to "expected values" that are based largely on experience. If the measured values for a single parameter are not within the expected range, then adjustments to the landfill gas flow are made by incrementally opening or closing the flow valve. It is well known, however, that when an adjustment is made at one gas wellhead, the flow (as well as other monitored parameters) at other wells may be impacted.

Ideally, a stable steady-state "tuned" condition is established at a landfill when acceptable performance is achieved and further adjustments to the control valve(s) are not necessary. However, it is well known that external factors, e.g., precipitation, temperature, and barometric pressure, as well as internal factors, e.g., cover soil thickness, waste age, thickness, composition and moisture content, change over time, constant measurements, assessments and adjustments at the gas wellheads need to be made.

Therefore, the "tuning" of the gas field to obtain consistent performance is a labor intensive activity, one that is exacerbated by the fact that, often, the tens (if not a few hundred) gas wells are adjusted by a lone technician who can probably make only one to two site visits per month.

What is needed, therefore, is a system to efficiently and accurately "optimize" the management of landfill gas.

BRIEF SUMMARY OF THE INVENTION

Embodiments of the present invention provide a stable, steady-state, i.e., a "tuned" condition, at a landfill by constantly measuring wellhead parameters, assessing these measurements and making adjustments at the gas wellheads, e.g., modifying a position of a wellhead valve. Thus, the system efficiently and accurately "optimizes" the management of landfill gas. In addition, measurements can be made across an entire gas field either simultaneously or in series. These results can be assessed and individual gas wellheads can be signaled to make incremental adjustments. The effects of the adjustments can then be further assessed by the ongoing measurements and the system performance can be optimized.

In one embodiment of the present invention, a method of managing landfill gases in a landfill includes: (a) receiving one or more first wellhead parameter values of a gas in a first wellhead; (b) comparing the one or more first wellhead parameter values to one or more first wellhead threshold values; (c) modifying a position of a first wellhead control valve in the first wellhead as a function of the comparisons in step (b); and (d) repeating steps (a)-(c).

In another embodiment of the present invention, a method of managing landfill gases in a landfill includes: (a) receiving a first set of wellhead parameter values associated with a first wellhead; (b) receiving a second set of wellhead parameter values associated with a second wellhead; (c) receiving information regarding positions of first and second control valves of the first and second wellheads, respectively, wherein the positions of the first and second control valves have been set as a function of the first and second sets of wellhead parameter values; (d) determining whether at least one of the first and second control valve positions should be changed to a new position as a function of the position of the other control valve and, if so, sending a control signal comprising the new position to the at least one of the first and second control valves.

BRIEF DESCRIPTION OF THE SEVERAL VIEWS OF THE DRAWINGS

Embodiments of the present invention may be better understood by referring to the following description in conjunction with the accompanying drawings in which.

DETAILED DESCRIPTION OF THE INVENTION

This application claims priority from U.S. Provisional Patent Application Ser. No. 61/625,353 filed Apr. 17, 2012 entitled "Automated Landfill Gas Wellhead Monitoring and Control System," the entire contents of which is hereby incorporated by reference for all purposes.

An automated landfill gas wellhead monitoring and control system will now be described. The system provides a novel solution to the complex optimization problem of landfill gas collection and management. Embodiments of the present invention include an automated gas control valve; field and remote monitoring and control systems; and an automated gas quality monitoring system.

Figure 1:
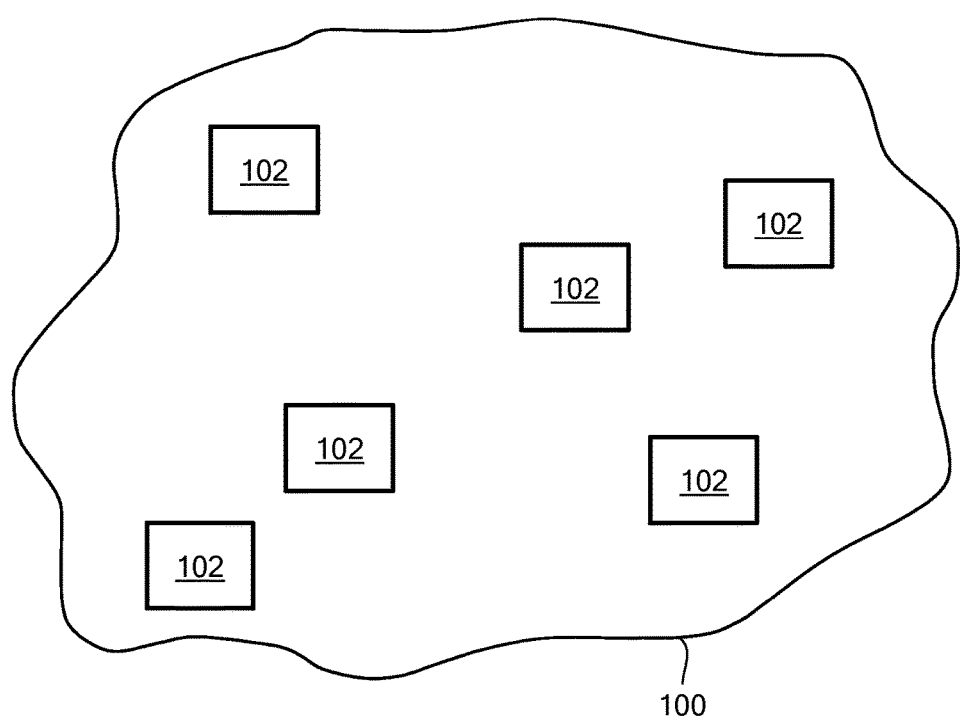
FIG. 1 is a schematic representation of wellheads distributed about a landfill.
Figure 2:
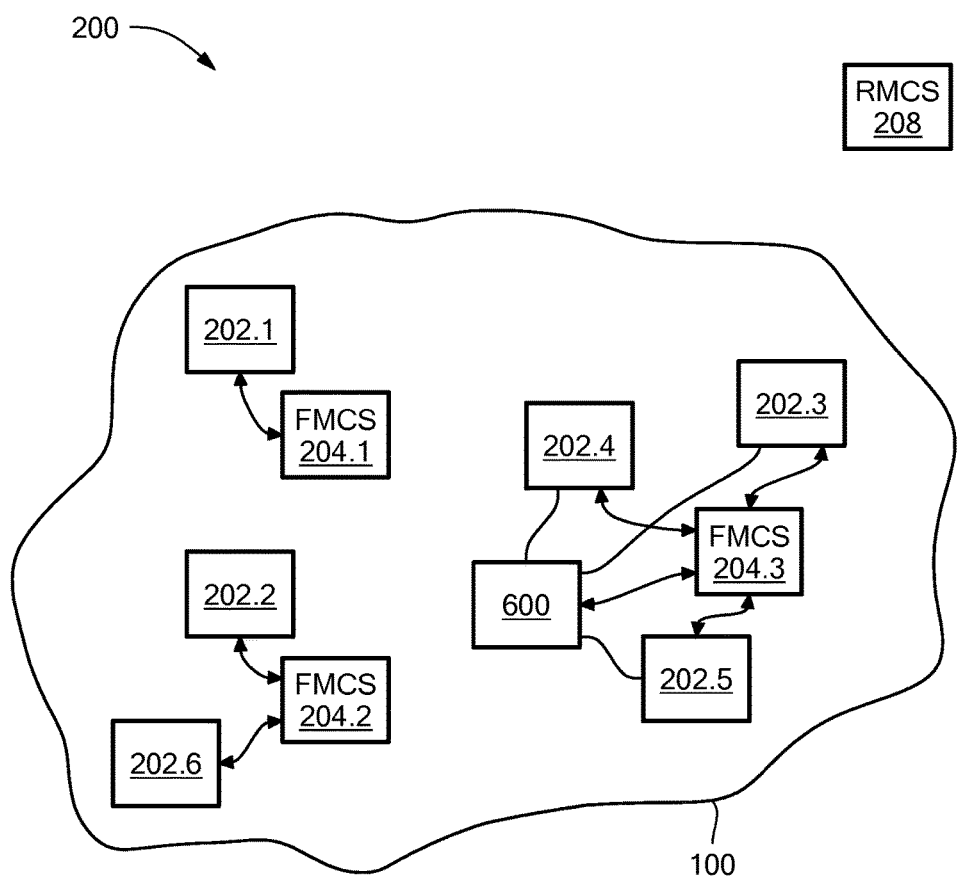
FIG. 2 is a schematic representation of an embodiment of the present invention.
Figure 3:
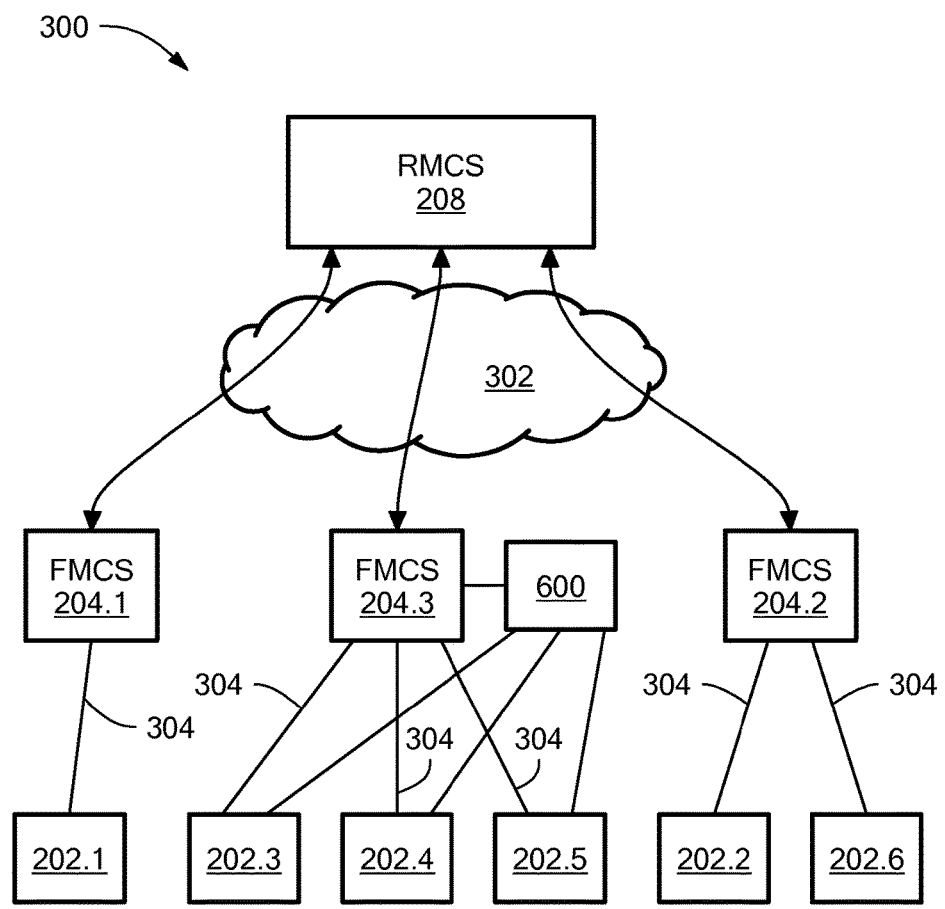
FIG. 3 is a functional block diagram of an embodiment of the present invention.

Referring now to FIG. 2, in one embodiment of the present invention, a system 200 includes a plurality of automated wellheads 202 positioned on landfill gas wells positioned about the landfill 100. The details of the automated wellhead 202 will be described in more detail below. One or more of the automated wellheads 202 are connected to a field monitoring and control system (FMCS) 204 depending on relative proximity of the gas wells that are distributed about the landfill 100. The FMCS 204 is connected to one or more wellheads 202 to both receive operating measurements regarding the well corresponding to the wellhead 202 as well as to control the wellhead 202 itself, as will be described in more detail below. In addition, a gas quality measuring system (GQMS) 600, the configuration and operation of which will be described below, may also be provided and connected to an FMCS 204. The FMCSs 204 are in communication with a remote monitoring and control system (RMCS) 208. The operation of the RMCS 208 will also be described in more detail below. The multiple FMCSs 204 communicate with the RMCS 208 in one embodiment via a wireless network as shown in FIG. 3 but the invention is not limited to only wireless communication. Depending on the conditions at a given site, the FMCSs 204 may be hardwired to the RMCS 208 or implemented with any known method of communicating between devices.

It should be noted that in the exemplary description to follow, gas is flowing in the system. In general, however, embodiments of the present invention may be equally applicable to any fluid flowing in a system. Thus, any reference to fluid or gas is meant to be interchangeable as one of ordinary skill in the art will understand that a gas may be considered a fluid.

Thus, the functional arrangement between the RMCS 208, the FMCSs 204, the GQMS 600 and the wellheads 202 is shown in FIG. 3. Here, the RMCS 208 and the FMCSs 204 communicate through a network 302 such as, for example, the Internet. Of course, the network 302 may be implemented as a LAN or WAN or other type of communication network and the invention is not limited by the choice of network. Further, in another embodiment, a second RMCS (not shown) may be in communication with the RMCS 208 and the FMCSs 204 to provide redundancy. Each of the wellheads 202 is coupled to an FMCS 204 by an interface 304, for example, wires or a bus configured to carry data signals.

Figure 5:
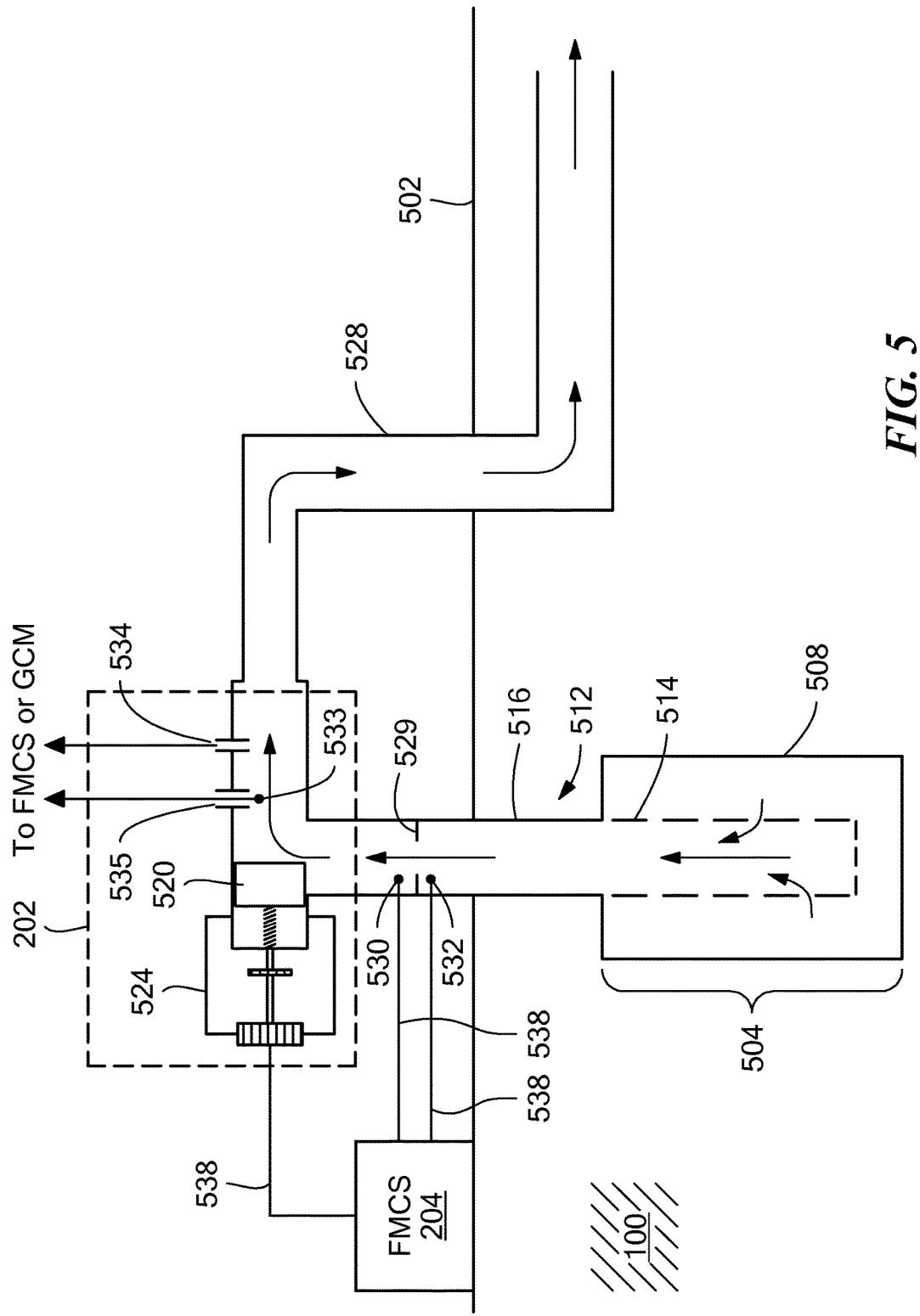
FIG. 5 is a schematic representation of an automated wellhead in accordance with an embodiment of the present invention.

The gas wellhead 202 extends above a ground level 502 of the landfill 100 as shown in FIG. 5. A gas well 504 is constructed by placing a pipe 512 into gravel 508. The pipe 512 comprises a perforated-wall section 514 and a solid-wall portion 516. This allows gas (represented by the arrows) to flow from the landfill into the perforated pipe 514 and then into the pipe 512. Gas flow from the landfill through the gravel pack 508 is facilitated by applying vacuum to header pipe 528, e.g., connected to a blower that provides the vacuum source.

A valve 520 is provided in the wellhead 202 and has its position controlled by an automated valve controller 524. The position of the valve 520 determines the flow of the gas from pipe 516 to pipe 528 by opening or closing an aperture through which the gas flows. As shown in FIG. 5, gas flow is measured by two vacuum sensors 530 and 532, which are connected, respectively, on opposite side of an orifice plate 529 that is placed in pipe 512 to restrict the flow and allow measurement of the pressure drop across the orifice plate 529. In one embodiment of the present invention the gas flow rate is assessed by calculations that consider differential pressures as gas flows through the orifice plate 529 or a pitot tube. Other flow sensors, including flowmeters, could be used to measure gas flow. In addition to gas flow, landfill gas temperature can be measured using a temperature probe 533 that is inserted within the gas stream through port 535. In addition, a gas quality sampling port 534 is provided downstream of the automated valve 520 to siphon off samples of gas for evaluation and testing, as will be described in more detail below.

There are several different types of valve 520 that may be implemented including, but not limited to, a rising stem control valve, a needle valve, a gate valve and a butterfly valve. The selection of valve type governs the degree of control that can be provided. For example, a rising stem control valve may require ten full turns from open to close, while a butterfly valve requires only ¼ turn from open to close. As is known, the more turns from open to close, the better the ability to control flow. The choice of valve type, therefore, is based on the desired level of control, power consumption considerations, durability and cost.

To control the valve 520, i.e., incrementally open or close it, a stepper motor or similar actuator (not shown) is attached to the valve 520 and controlled via a control wire or bus 538 by operation through the FMCS 204, as will be described below. In addition, the output from the vacuum sensors 530, and 532 are provided, via control wires 538, to the FMCS 204. Similarly, the output from the temperature probe 533 is connected via control wires to the FMCS 204. Finally, the output from the gas sampling port 534 may be directed to the FMCS 204 when gas quality is measured.

In conventional systems, the gas sampling port 534 can be used to manually measure pressure, temperature and gas quality. In these applications, however, the well field technician typically connects a portable manometer, thermometer and/or self-contained gas quality meter to the sampling port 534, obtains specific measurements and records the values. In various embodiments of the present invention, automated measurements of the gas pressure, flow, and temperature are obtained using sensors that are connected to (or are internal to) the FMCS 204, as described above.

In addition, in order to measure landfill gas quality at each wellhead in a conventional non-automated system, a gas quality meter is used to analyze the relative composition of methane, carbon dioxide and oxygen in the landfill gas stream. The well field technician typically connects a portable gas quality meter to the sampling port 534 and extracts a small sample of gas for measurement of the landfill gas constituents and concentrations. In one embodiment of the present invention, the FMCS 204 on each wellhead 202 is provided with various gas quality sensors that replicate the functionality of a portable gas quality meter. In some instances, however, the costs associated with including gas quality sensors on each gas wellhead 202 may be prohibitive. Advantageously and as part of embodiments of this invention, an automated gas quality monitoring system that avoids the costs of providing gas quality sensors on each gas wellhead has been developed and will now be described.

Figure 6:
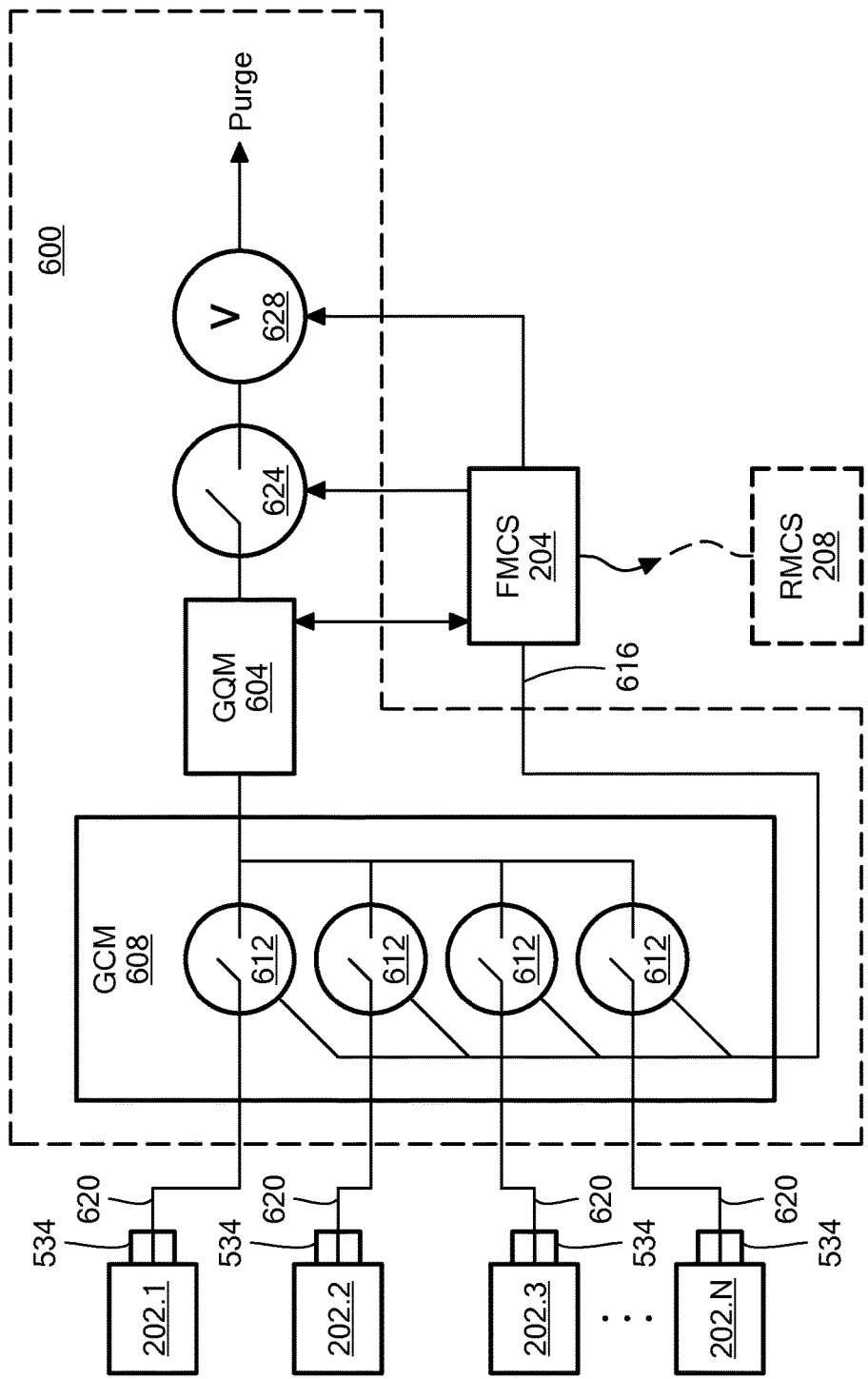
FIG. 6 is a schematic representation of a gas quality monitoring system in accordance with an embodiment of the present invention.

Referring now to FIG. 6, a gas quality monitoring system 600 for analyzing and monitoring gas quality for a series of gas wells includes a gas quality meter (GQM) 604 connected to an output of a gas collection manifold (GCM) 608 having a plurality of solenoid valves 612. Each valve 612 has a respective input coupled to a gas sampling port 534 of a wellhead 202. The fluid connection of the gas well to the gas collection manifold, in one embodiment, uses flexible tubing 620 that extends from the gas quality port 534 on a specific gas wellhead 202 to the respective inlet port on the GCM 608. The valves 612 are controlled, via a valve control line 616, by the FMCS 204 to select a specific well from which the gas will be tested. The FMCS 204 also controls a vacuum valve 624 and a vacuum source 628 in order to "pull" a gas sample from a specific well through the selected valve 612 for analysis by the GQM 604.

The operation of the automated gas quality monitoring system 600 includes: (i) progressive opening/closing of specific solenoid valves 612; (ii) initiation of gas flow from an individual well through the GQM 604; (iii) testing for landfill gas composition by the GQM 604; and (iv) subsequent purging of the tested gas by closing one solenoid valve 612 and opening the solenoid valve 612 for the next gas well. The results of the analysis of the gas sample are provided by the GQM 604 to the FMCS 204 for evaluation and/or transmission on to the RMCS 208.

Advantageously, the automated gas quality monitoring system 600 can measure landfill gas quality on a near-continuous basis using a limited number of GQMs 604. The number of inputs on the GCM 608 is dictated by the landfill gas system design and the preference of the designer. Factors that affect the number of inputs include the distance between gas wells, the distance between gas wells and the GQM 608 and the number of GQMs 604 dedicated to the site.

With reference again to FIG. 5, tuning a wellhead 202 involves using the FMCS 204 to first collect measurements of gas flow via vacuum sensors 530 and 532, temperature via temperature sensor 533, and (potentially) gas quality using the GQM 604 as described above. This information may be processed on the FMCS 204 directly or transmitted to the RMCS 208 where the values are assessed and compared to anticipated reference values. In various embodiments of this invention, the FMCS 204 or RMCS 208 uses control logic and sends a signal back to the FMCS 208 to incrementally open or close the respective valve 520 based on sensor data, e.g., the amount of well vacuum, and gas flow based on, for example, differential pressure, gas temperature and/or gas quality.

Figure 4:
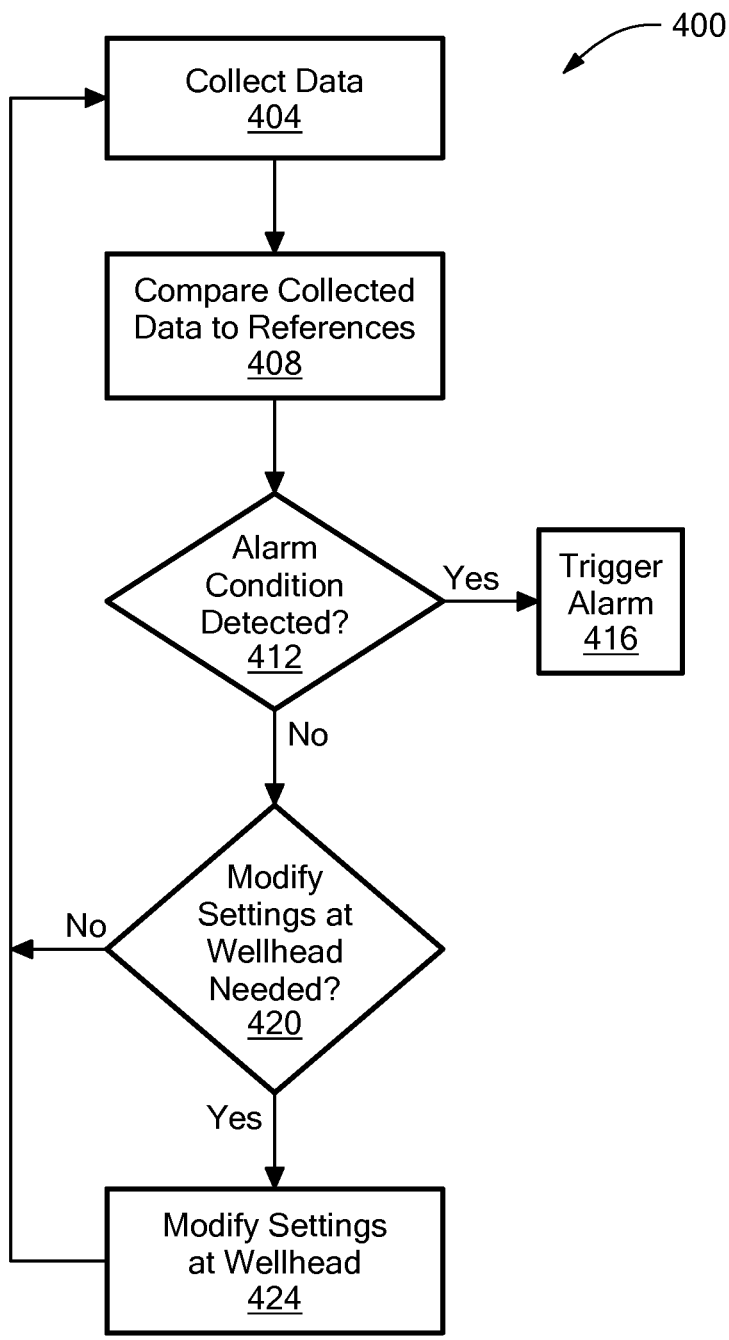
FIG. 4 is a method in accordance with an embodiment of the present invention.

Generally, therefore, a method 400 implemented in the FMCS 204, referring now to FIG. 4, includes collecting data from a plurality of sensors connected to the wellhead or elsewhere in the collection system (404); comparing the collected sensor data to a reference value or to a set of gas quality and quantity goals (408); assessing whether a comparison to a reference value identifies a warning condition, e.g., excessive gas temperature, a leak or damage in the gas collection and transmission system, (412) and, if so, then triggering an alarm (416) or determining whether the comparison (420) warrants action to change the current setting of the gas control valve(s) and, if so, then sending a signal to the FMCS 204 to the valve actuator to initiate an action (424) of the control valve 520. After allowance for the system to respond to a specific valve setting, i.e., a "settling" time, the optimization process ideally would be repeated.

Several algorithms may be used in this control system. For example: (i) if the flow is too low as measured by vacuum sensors 530 and 532, the valve 520 will be opened incrementally; (ii) if the flow is excessive as measured by high measurements from temperature sensor 533 or excessive oxygen values from the GQM 604, the valve 520 will be incrementally closed; or if the gas quality for methane and carbon dioxide is too low as measured by the GQM 604, the valve 520 will be incrementally closed so that the well is not "pulled" too hard. After all adjustments, a period of waiting time will be provided to allow the gas field 100 to re-establish an equilibrium condition before subsequent control logic steps are initiated.

As an automated system implemented at a landfill 100, this method occurs at each gas wellhead and incremental changes to individual gas control valves 520 occur on a regular basis. Of course, the implementation at the wellheads could be synchronized to either all happen at the same time, to occur such that only one wellhead is being modified at a given time or asynchronously. Advantageously, embodiments of the present invention allow for multiple wellheads to be modified at the same time.

In addition to the advantage of obtaining monitoring information and providing control of individual wells, another advantage of the embodiments of the present invention is that the collective landfill gas management system can be operated to achieve complex global, as well as local, optimization goals. For example, the collected results may indicate that certain portions of the landfill 100 generate/produce landfill gas at different rates and algorithms may be implemented to learn from these local site-specific conditions. The local production rates for specific wells may similarly be compared to the theoretical values that are based on waste thickness, moisture and age. Therefore, adjustments can be made by adjusting the reference values in according to system calibrated results. In addition, gas system performance is known to vary in response to barometric pressure. Therefore, by monitoring weather patterns and "sensing" when barometric changes are imminent, control can be dispatched to the FMCSs 204 to adjust the valves in anticipation of the barometric change and then returning to the "normal" position when the weather front passes.

It is anticipated that the route to achieving many global optimization goals includes the use of non-linear optimization techniques, to include the use of genetic algorithms or neural networking. For example, if a low flow condition is sensed in a series of wells, the signal to the FMCS 204 would be to open the control valve 520. However, once the system "learns" the sensitivity of gas flow to valve positioning, a control signal can be adjusted to automatically adjust the incremental adjustment. An embodiment of this invention will allow for the time- and weather-dependent response of a landfill as well as the effects of incremental changes on system performance.

An ancillary benefit of this approach is that all collected data are recorded in a central database. In this manner, real-time measurements can be recorded from every wellhead or sensor location. These data then can be reviewed and conventional algorithms can be assessed and adjusted in near real-time. This capability allows the system to essentially be able to self-calibrate periodically and provide the user with cause-effect data validation.

As described herein, the system provides a novel solution to the complex optimization problem of landfill gas collection and management. The FMCS 204 and the RMCS 208, operating in communication with one another facilitate optimizing and documenting performance of the landfill gas management.

Figure 7:
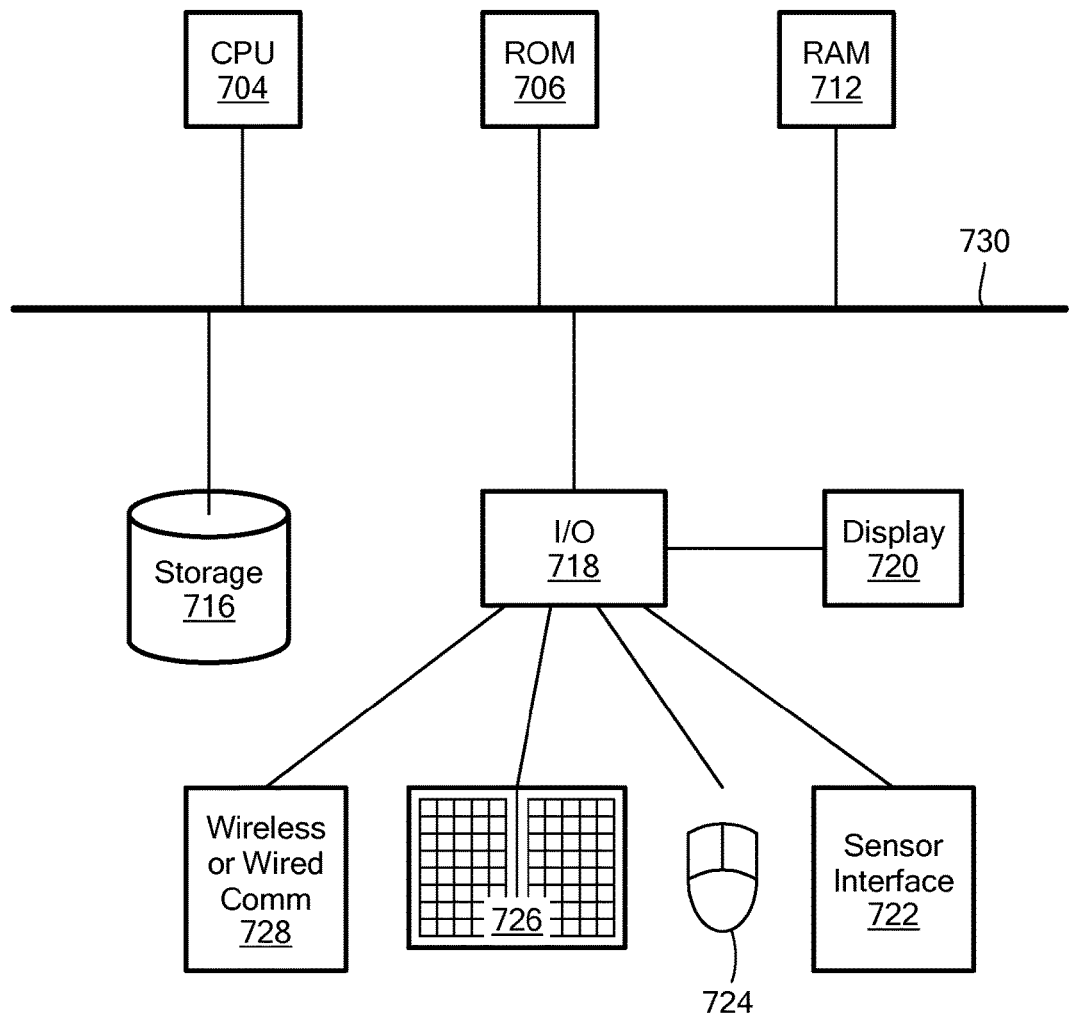
FIG. 7 is a functional block diagram of an embodiment of the present invention.

In the embodiments of the present invention, each of the FMCS 204 and the RMCS 208 comprises hardware and software configured to implement the processes described herein. Referring now to FIG. 7, each includes, generally, a CPU 704, a ROM 708, RAM 712, storage 716, I/O 718, for example, a display 720, a sensor interface 722, mouse 724, keyboard 726 and wired/wireless interface 728. A communication bus 730 is also implemented to allow communication between the foregoing components. One of ordinary skill in the art will understand that not all components are necessarily implemented or needed. In addition, the RMCS 208 may be a single server or multiple servers having processors, memory and network connectivity, manifested logically as a software instance or physically as a hardware instance, or some combination of both, such as in public or private cloud hosting cloud-computing platforms. Further, the CPU 704 may comprise one or more microcontrollers, programmable logic controllers (PLC) or single board computers.

The monitoring and control system described herein captures, transmits, and stores the received sensor information from the various wellheads and collection system locations, processes and analyzes these data, evaluates attainment of optimization goals, and ultimately transmits signals to control/adjust the valves and/or actuators.

The monitoring and control system includes software- and hardware-enabled routines or subroutines (software subroutines) that provide the described functionality.

The monitoring and control system is configured to integrate data from other resources. These other resources can be an internet-connected resource, i.e., a "virtual sensor" providing data. As a result, this internet-based data can be used as a component of the control logic contained in the methods implemented to control the wellheads. In one non-limiting example, rainfall and weather data, as well as weather forecasts, may be used to predict landfill gas field behavior and adjust system functions in advance of forecasted conditions, as necessary.

Advantageously, the monitoring and control system detects abnormal performance caused by, for example, damage to the well system components, leakage, vandalism, adverse weather, etc. and triggers/transmits an alarm that can prompt immediate action by the operator or well field technician.

The monitoring and control system will also include the ability to utilize complex global optimization algorithms that may include non-linear optimization techniques. Advantageously, while control and adjustment of wellhead function to achieve local optimization of gas quality and quantity provides a benefit and advancement of the industry, the complex global optimization, as implemented herein will provide improvements that have, before now, been unavailable. As described previously, the information compiled in the RMCS 208 can be assessed using conventional algorithms and various optimization hypotheses can be tested. Signals can be transmitted to the FMCSs 204 and a systems response can be detected and recorded by the RMCS 208. In this way, true system optimization and automated "intelligent adjustments" can be made.

It should be noted that the automated gas control valve and the monitoring and control system described above can be operated without the inclusion of the automated gas quality monitoring system 600. In some situations, landfill owners, operators and regulators may not require gas quality measurements at each gas wellhead on a continuous basis. Rather, gas quality may be measured at a specific point(s) in the landfill gas transmission system or measurement of gas quality of a combined gas stream from a number of gas wells may be allowed.

Deployment of a system where the automated gas wellhead 202, the GQM 600, the FMCS 204 and the RMCS 208 is summarized as follows.

Initially, the landfill gas collection and control system is tuned using either conventional practices, i.e., non-automated controls, or an automated approach. A baseline set of measurements is obtained regarding system vacuum pressure, differential pressure at the wellhead, gas flow, flow valve setting, gas temperature, and gas quality, i.e., relative methane, carbon dioxide, oxygen and nitrogen/balance quantities.

The automated wellhead 202 is configured such that the gas control valve actuator 524 is attached to the gas control valve 520. In addition, at this stage the sensors, e.g., the vacuum sensors 530 and 532 are connected to the FMCS 204 that is located adjacent to a gas well (or potentially at some distance from the wellhead). As noted above, an FMCS 204 may be connected to more than one wellhead 202. Optionally, the gas quality sensor manifold 534 may be connected, via tubing, to the GQM 600 if real-time assessment of gas quality is desired.

Initial readings from the sensors are recorded at the FMCS 204 and may be compared to values measured by the manual instruments and as recorded in a database accessed by the RMCS 208.

A field computer is connected to the RMCS 208 via an internet (or other wired or wireless) connection and initial readings are obtained. Using software controls from the field computer, test pulses are initiated by the monitoring and control system to confirm functional operation of the actuators on the gas control valves.

Interconnection and visualization of the processed information is confirmed using web based (or other wireless) services on the RMCS 208.

Operational software settings, e.g., sampling interval, alarm levels, etc., are selected and the FMCS units 204 and the central RMCS 208 commence control of the landfill gas collection system.

At a selected interval, readings from the various sensors and "virtual sensors" are obtained, compared to reference values or evaluated relative to optimization goals. As the system assimilates information, algorithms will be incorporated for assessment of the results. If an adjustment to the gas control valve(s) is warranted, a signal from the FMCS controls the operation of the actuator/stepper motor.

Information collected at the RMCS 208 is processed and various reports, plots, notifications and visual representations are generated and available to stakeholders.

Embodiments of the present invention provide the combined effects of precision gas well flow control, real-time measurement and recording of landfill gas parameters, processing and visualization of the processed information and feedback control of the wellhead gas control valve. The automated gas wellhead and the monitoring and control system described herein provide significant improvements to the management of landfill gas control systems. The local collection/optimization of gas quality and quantity and global optimization functionality provide improvements that before now have not been possible.

While above-described embodiments may generally depict a computer implemented system employing at least one processor executing program steps out of at least one memory to obtain the functions herein described, it should be recognized that the described methods may be implemented via the use of software, firmware or alternatively, implemented as a dedicated hardware solution such as in an application specific integrated circuit (ASIC) or via any other custom hardware implementation.

It is to be understood that the present invention has been described using non-limiting detailed descriptions of embodiments thereof that are provided by way of example only and are not intended to limit the scope of the invention. Features and/or steps described with respect to one embodiment may be used with other embodiments and not all embodiments of the invention have all of the features and/or steps shown in a particular figure or described with respect to one of the embodiments. Variations of embodiments described will occur to persons of skill in the art. It should be noted that some of the above described embodiments include structure, acts or details of structures and acts that may not be essential to the invention and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present invention. Therefore, the scope of the invention is limited only by the elements and limitations as used in the claims.

What is claimed is:

1. A method of managing landfill gases in a landfill, the method comprising:
   (a) receiving one or more first wellhead parameter values of a fluid in a first wellhead and receiving one or more second wellhead parameter values regarding a second wellhead, the first and second wellheads being separate and distinct wellheads within the landfill;
   (b) comparing the one or more first wellhead parameter values to one or more first wellhead threshold values and (b)(1) comparing the one or more second wellhead parameter values to one or more second wellhead threshold values;
   (c) receiving external parameter values;
   (d) selectively modifying a position of a first wellhead control valve in the first wellhead as a function of the comparing in step (b), the comparing in step (b)(1), and the external parameter values received in step (c); and
   (e) repeating steps (a)-(d),
   wherein the external parameter values comprise weather forecast data from at least one external resource predictive of weather conditions at the landfill.

2. The method of claim 1, further comprising:
   (d)(1) waiting at least a predetermined amount of time between steps (c) and (e).

3. The method of claim 1, further comprising:
   receiving control valve position information regarding a control valve of a second wellhead,
   wherein step (d) further comprises selectively modifying the position of the first wellhead control valve as a function of the second wellhead control valve position information.

4. The method of claim 1, wherein the one or more first and second wellhead values of step (a) comprise at least one of:
   a vacuum level value;
   a flow level value; and
   a temperature value.

5. The method of claim 1, wherein the fluid in the first wellhead is a gas, the method further comprising:
   receiving gas quality parameter values associated with the first wellhead gas, and
   wherein step (d) further comprises selectively modifying the position of the first wellhead control valve as a function of the gas quality parameter values.

6. The method of claim 1, further comprising:
   modifying a position of a second wellhead control valve in the second wellhead as a function of at least one of the comparisons in steps (b) and (b)(1).

7. The method of claim 1, further comprising:
   modifying a position of a second wellhead control valve in a second wellhead as a function of the modified position of the first wellhead control valve.

8. The method of claim 7, further comprising:
   waiting at least a predetermined amount of time after modifying the position of the first wellhead control valve before modifying the position of the second wellhead control valve.

9. The method of claim 1, wherein the weather conditions comprise at least one of: barometric pressure; rainfall; temperature; wind speed; and wind direction.

10. A method of managing landfill gases in a landfill, the method comprising:
    (a) receiving a first set of wellhead parameter values associated with a first wellhead;
    (b) receiving a second set of wellhead parameter values associated with a second wellhead, the first and second wellheads being separate and distinct wellheads within the landfill;
    (c) receiving external parameter values;
    (d) receiving information regarding positions of first and second control valves of the first and second wellheads, respectively, wherein the positions of the first and second control valves have been set as a function of the external parameter values and a comparison of at least one of the first and second sets of wellhead parameter values to a respective wellhead threshold value; and
    (e) determining whether the position of one of the first and second control valves should be changed to a new position as a function of the position of the other of the first and second control valves and, if so, sending a control signal comprising the new position to the respective control valve, and selectively modifying the position of the one of the first and second control valves based on the control signal,
    wherein the external parameter values comprise data from at least one external resource predictive of weather conditions at the landfill.

11. The method of claim 10, wherein step (e) further comprises making the determination as a function of the received external parameter values.

12. The method of claim 10, wherein the external parameter value further comprises one of current:
    air temperature;
    below ground temperature;
    barometric pressure; and
    wind speed and wind direction.

13. The method of claim 10, wherein the weather conditions comprise at least one of: barometric pressure; rainfall; temperature; wind speed; and wind direction.

14. A system for managing gas in a landfill, the system comprising:
    a receiver configured to receive a first set of wellhead parameters corresponding to a first respective wellhead in the landfill, a second set of wellhead parameters corresponding to a second respective wellhead in the landfill, the first and second wellheads being separate and distinct wellheads within the landfill, and one or more external condition parameters;
    a comparator, coupled to the receiver, configured to compare at least one first wellhead parameter in the received first set of parameters to a corresponding threshold value and at least one second wellhead parameter in the received second set of parameters to a corresponding threshold value; and a wellhead valve controller, coupled to the comparator and the receiver, configured to calculate and output a first wellhead valve control signal to set a first wellhead control valve position of the first wellhead as a function of the one or more external condition parameters and at least one first wellhead parameter-to-threshold value comparison and the at least one second wellhead parameter-to-threshold value comparison, and to selectively modify the position of the first wellhead control valve based on the control signal, wherein the one or more external parameters comprise data from at least one external resource predictive of weather conditions at the landfill.

15. The system of claim 14, wherein:
the receiver is further configured to receive first valve position information regarding a respective position of the first wellhead control valve; and
the wellhead valve controller is further configured to calculate the first wellhead valve control signal as a function of the received first valve position information.

16. The system of claim 14, wherein:
the wellhead valve controller is further configured to calculate and output a second wellhead valve control signal to set a second wellhead control valve of the second wellhead as a function of:

the at least one first wellhead parameter-to-threshold value comparison;
the at least one second wellhead parameter-to-threshold value comparison; and
the one or more external condition parameters.

17. The system of claim 15, wherein:
the receiver is further configured to receive second valve position information regarding a respective position of a second wellhead control valve; and
the wellhead valve controller is further configured to calculate the first wellhead valve control signal as a function of the received second valve position information.

18. The system of claim 14, wherein the one or more external condition parameters further comprise one or more of current:
air temperature;
below ground temperature;
barometric pressure;
wind speed; and
wind direction.

19. The system of claim 14, wherein
the wellhead valve controller is further configured to wait a predetermined amount of time prior to outputting the first wellhead valve control signal.

20. The system of claim 14, wherein the weather conditions comprise at least one of: barometric pressure; rainfall; temperature; wind speed; and wind direction.

* * * * *